Jan. 7, 1941.  W. GRUMBACHER  2,228,110
HINGE CONSTRUCTION
Filed Jan. 4, 1936  4 Sheets-Sheet 1
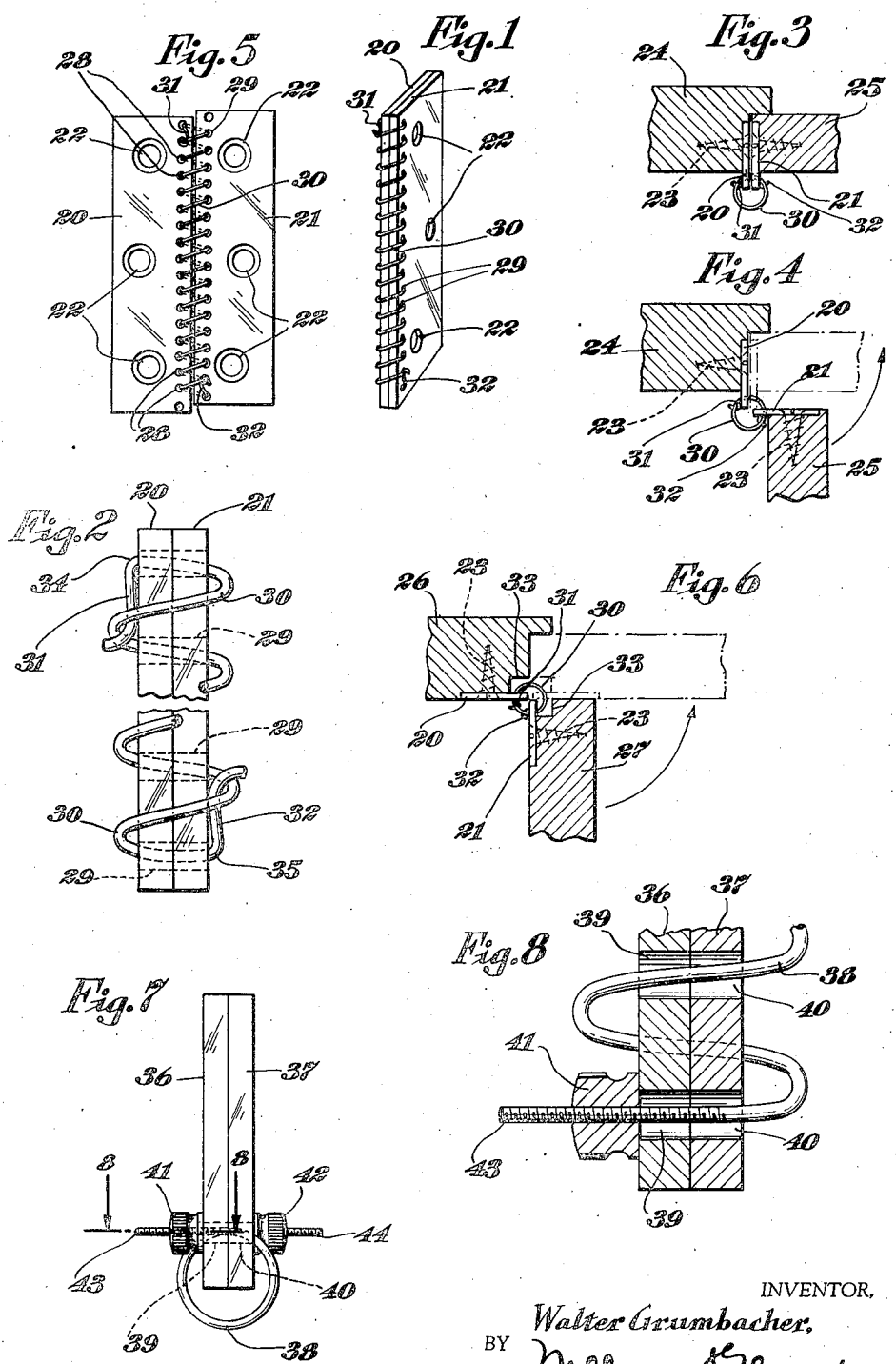
INVENTOR,
Walter Grumbacher,
BY
ATTORNEY.

Jan. 7, 1941.  W. GRUMBACHER  2,228,110
HINGE CONSTRUCTION
Filed Jan. 4, 1936   4 Sheets-Sheet 2
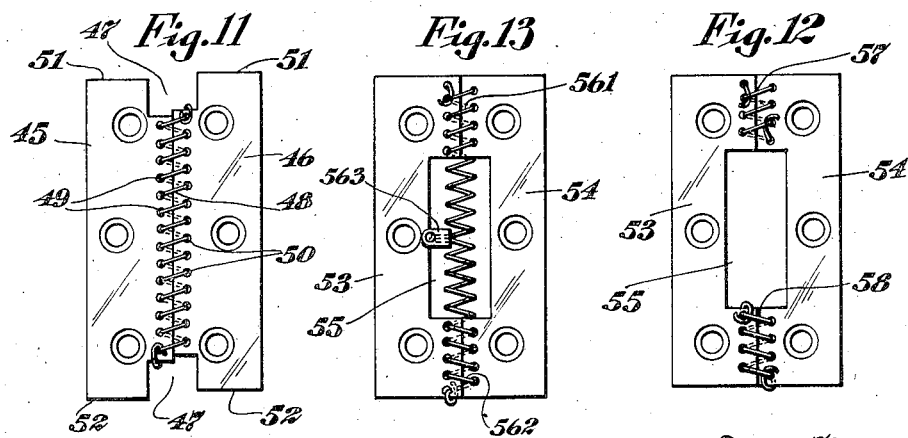
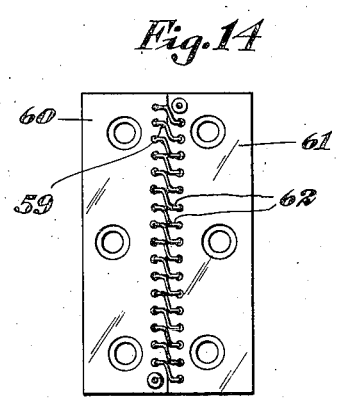
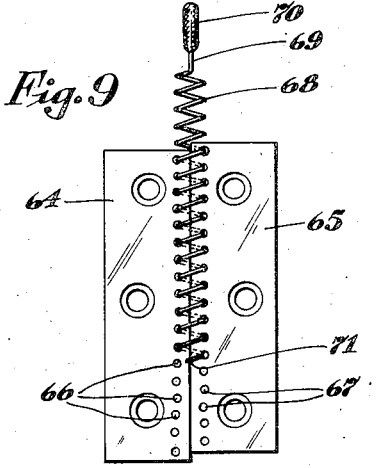
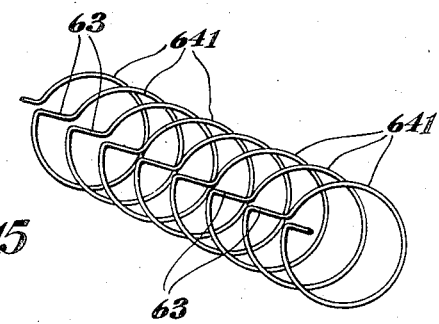
INVENTOR,
Walter Grumbacher,
BY
ATTORNEY.

Jan. 7, 1941.          W. GRUMBACHER          2,228,110
HINGE CONSTRUCTION
Filed Jan. 4, 1936          4 Sheets-Sheet 3
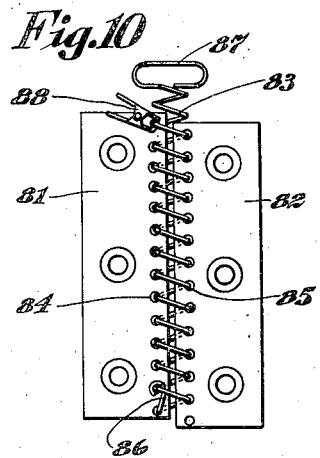
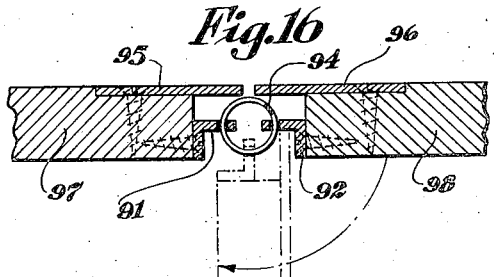
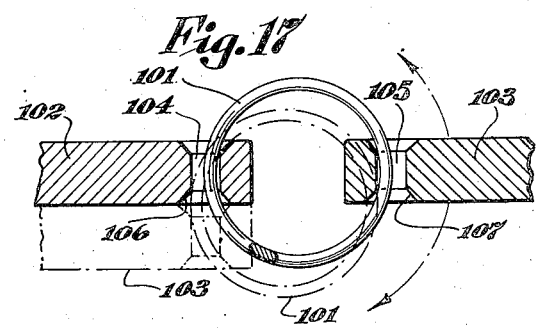
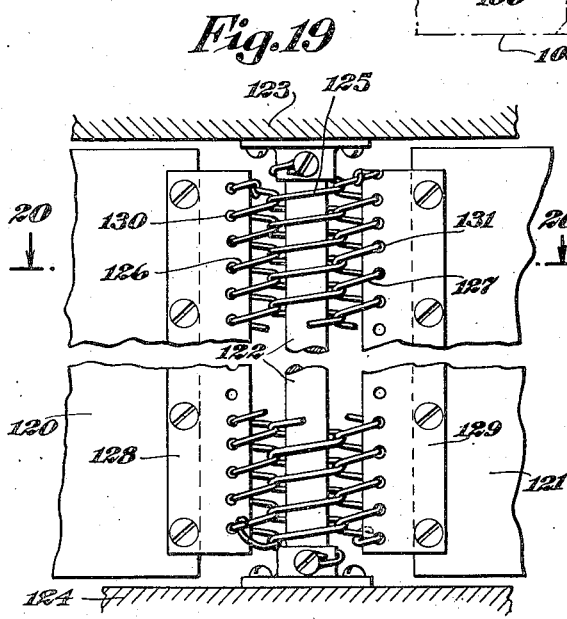
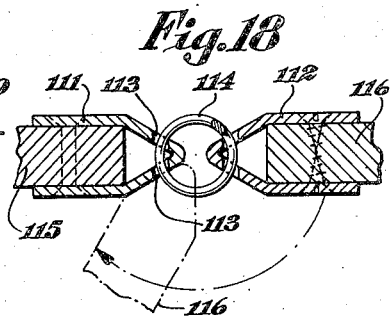
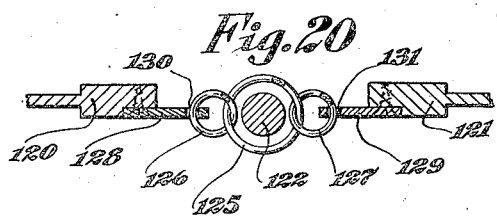
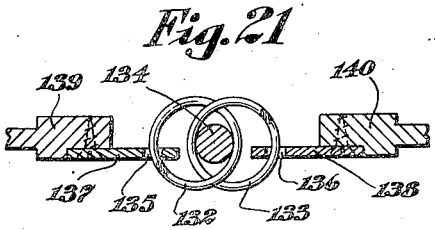
INVENTOR,
Walter Grumbacher,
BY
ATTORNEY.

Jan. 7, 1941.                W. GRUMBACHER                 2,228,110
                            HINGE CONSTRUCTION
                            Filed Jan. 4, 1936            4 Sheets-Sheet 4
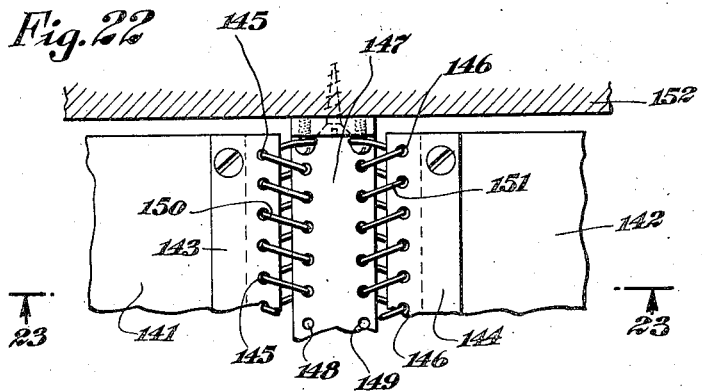
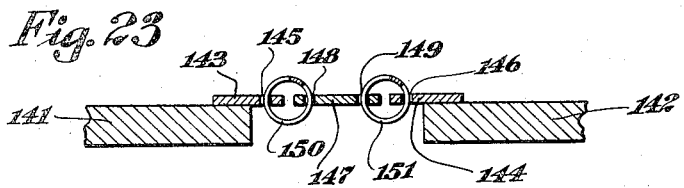
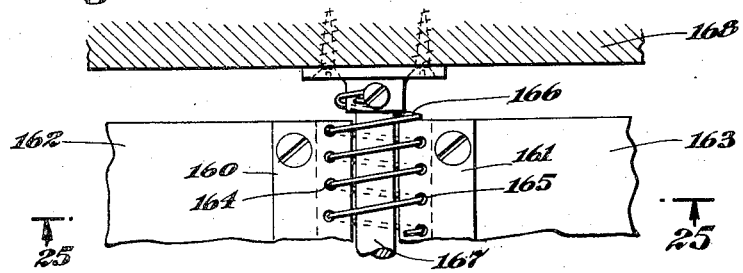
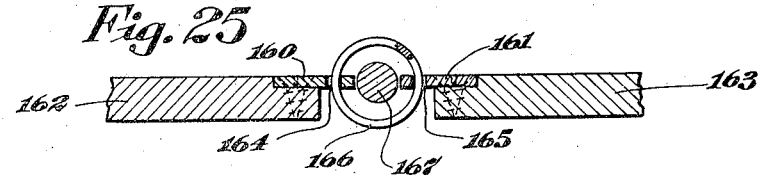
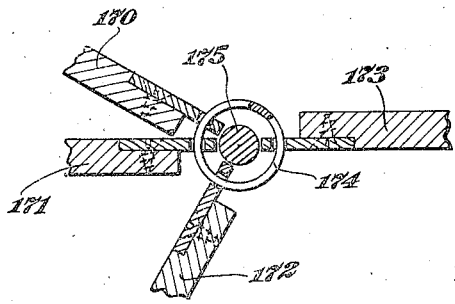
INVENTOR,
Walter Grumbacher;
BY
ATTORNEY.

Patented Jan. 7, 1941

2,228,110

UNITED STATES PATENT OFFICE 2,228,110

HINGE CONSTRUCTION

Walter Grumbacher, New York, N. Y.

Application January 4, 1936, Serial No. 57,486

7 Claims. (Cl. 16—180)

My present invention relates generally to hinge constructions and has particular reference to hinge constructions for structural elements such as doors or the like.

A general object of the invention is to provide a hinge construction of novel and unique character, which is devoid of the customary hinge pin.

A hinge construction of the present character may consist of two or more hinge elements adapted to be attached, respectively, to structural elements which are to be pivotally connected, such as, by way of example, a door and a door jamb. The hinge elements are retained in pivotably connected relation by one or more connectors which comprise a series of loops arranged in coaxial alignment. One of the hinge elements may have a series of spaced perforations adjacent to one edge, and each loop is interlaced with one perforation, and the companion element or elements may be of similar type, so that said looped connector will serve to unite said elements in hinged relation, or the companion elements may consist of some other way of supporting the looped connector. My invention also contemplates the support of the looped connector directly from a structural element, such as the door or door jamb, instead of supporting it from an element to be fastened to such door or door jamb.

In one simple embodiment of the invention, the connector is in the form of a single spiral element which is interlaced spirally with the two sets of perforations, means being provided at at least one end of said element to lock it against unlacing movement.

One of the features of my invention lies in constructing the spiral element of resilient wire or the like and in providing a means for impressing a spiral tension upon the element. One way of accomplishing this is to provide an abutment at one end of the element and bearing against one of the hinge plates and providing a similar abutment at the other end of the element, and bearing against the other hinge plate.

A further feature of the invention lies in providing a means for adjustably impressing a variable spiral tension upon the element. This may be accomplished by providing abutments, as hereinbefore mentioned, together with a means for shifting at least one of the abutments along the spiral element.

In a modified construction, successive loops of the connecting element are constructed so that portions thereof are arranged in planes substantially perpendicular to a common axis.

In other modifications, one end of the spiral element is arranged in alignment with the spiral axis, and has means thereon adapted for manipulation so as to effect the threading and unthreading of the elements into interlaced engagement with the hinge plates or to effect adjustments of the same.

Other features of the invention will be more fully set forth hereinafter.

I achieve the foregoing objects, and such other objects as may hereinafter appear or be set forth, in the manner illustratively exemplified in the accompanying drawings, in which:

Figure 1 is a perspective view of a hinge constructed in accordance with the present invention;

Figure 2 is a greatly enlarged end view of the same, with an intermediate part of the hinge broken away for the sake of compactness;

Figure 3 is a cross sectional view showing the hinge of Figure 1 in association with two structural elements;

Figure 4 is a view similar to Figure 3, showing the manner in which such elements are pivotally connected;

Figure 5 is a view of the hinge with the hinge plates opened up so as to lie in the same plane;

Figure 6 is a view similar to Figures 2 and 4, showing an alternative way of applying the hinge to the structural elements;

Figure 7 is an end view on an enlarged scale, illustrating a modification wherein a variable spiral tension may be effected;

Figure 8 is a greatly enlarged sectional view taken substantially along the line 8 of Figure 7, looking in the direction of the arrow;

Figures 9 to 14 are views similar to Figure 5, respectively, illustrating modifications;

Figure 15 is a fragmentary perspective view of a modified spiral element such as that shown in Figure 14;

Figure 16 is a sectional view similar to Figures 3 and 4, illustrating a further modified form of my invention applied to a pair of structural elements;

Figure 17 is a sectional view, similar to Figure 16, showing a looped connector connected directly to a pair of structural elements, so that they may pivot relatively to each other through an angle of 360°;

Figure 18 is a sectional view similar to Figure 16, of a modified construction, in which each hinge plate is provided with two rows of perforations adapted to receive a looped connector;

Figure 19 is an elevational view, with portions broken away, showing a double door construction in which one of the hinge elements is constituted by a looped spiral element;

Figure 20 is a sectional view on the line 20—20 of Figure 19, looking in the direction of the arrows;

Figure 21 is a sectional view similar to Figure 20, showing another double door construction;

Figure 22 is a fragmentary elevational view of still another double door construction;

Figure 23 is a sectional view on the line 23—23 of Figure 22, looking in the direction of the arrows;

Figure 24 is a view similar to Figure 22 of a further double door construction;

Figure 25 is a sectional view on the line 25—25 of Figure 24, looking in the direction of the arrows; and Figure 26 is a sectional view showing a hinge construction having more than two hinge elements, applied to elements to be pivotally connected.

For illustrative purposes I have shown, in Figures 1 to 6, a pair of hinge plates 20 and 21 which are of equal size and are substantially rectangular. Such plates may be composed of rigid material such as metal. In Figures 1 and 2 I have shown the hinge plates in superposed relationship; and in Figure 5 they are shown in a relation which disposes them in substantially a single plane, and it will be observed that, due to the pitch of the spiral, the upper and lower edges of the hinge plates, which are shown in registration in Figure 1, are no longer in alignment but are off-set from each other. Each of the plates is adapted to be secured to one of two structural elements which are to be pivotally connected. With this object in view, I prefer to provide openings 22 in the hinge plates, adapted to receive screws 23 or similar elements for securing the hinge plates to the structural elements. For example, in Figures 3 and 4, I have shown the hinge plate 20 secured to a door jamb 24, and I have shown the hinge plate 21 secured to a door 25. In Figure 6, the hinge plate 20 is secured to a door jamb 26 in a somewhat different manner, and the hinge plate 21 is secured to the corresponding door 27.

Parallel and adjacent to the inner edge of the hinge plate 20 are a series of longitudinally spaced perforations 28. A similar set of perforations 29 is provided parallel and adjacent to the inner edge of the plate 21.

In the structure illustratively exemplified in Figures 1 to 5, the connector consists of a spiral element 30 which is conveniently made of metallic wire or its equivalent, and may further be of resilient material. It will be observed that the spiral element 30 is interlaced with the perforations 28 and 29, this interlacing being effected by threading the spiral element successively through the perforations in the hinge plates, the end of the spiral being passed successively through one of the perforations 29, then through an adjacent perforation 28, and so on.

In order to hold the spiral element from an unlacing movement, an abutment is provided at at least one end of the spiral element, and, preferably, at both ends. For illustrative purposes I have shown an abutment 31 at one end of the element, and a similar abutment 32 at the opposite end. Each of these abutments is formed by the end of the spiral element itself; more particularly, by making a sharp kink or bend in the spiral element, as shown most clearly in Figure 2 at 34 and 35. Other forms of abutments may obviously be formed or provided without departing from the spirit of the invention.

In Figure 3, the door 25 is shown in closed relation with respect to the jamb 24, the hinge plates being in this case secured to the end edge of the door and the corresponding end edge of the door jamb. It will be observed that the hinge plates are substantially concealed when the door is closed. Figure 4 shows the manner in which the door may be swung into an open position, and the manner in which the spiral element 30 holds the hinge plates, and hence the two structural elements, in pivotally connected relation.

In Figure 6, the hinge plates are secured to the outer surfaces of the door and door jamb, so that when the door is closed (in the dot-and-dash position) the two hinge plates are visible in aligned relation. Obviously, in such an event, it may be desirable to provide the hinge plates with an ornamental contour. It may also be necessary, in such an arrangement, to provide cut-outs or recesses 33 in the structural elements so as to accommodate the spiral element 31.

One of the outstanding advantages of the present construction lies in the fact that the customary hinge pin is unnecessary. The structure of the hinge is thereby greatly simplified. A further and unique advantage arises from the fact that the spiral element may be composed of resilient material, in which case a spiral tension may be applied thereto so that the connector may serve the additional function of a spring for urging the door (or other structural element) into or out of a normal desired position.

For example, upon referring to Figure 2, it will be observed that the kinks or bends 34 and 35 are provided closely adjacent to the corresponding hinge plates. As a result, if the spiral element is of resilient wire or the like, the hinge plates 20 and 21 have a normal tendency to assume the superposed relation of Figures 1 and 2. This arises from the fact that a pivotal movement of the plates out of this relationship tends to impress a spiral tension upon the element 30. By "spiral tension" I refer to the stress which is set up by an action tending to "wind up" the spiral into a tighter coil.

Obviously, such a spiral tension may be advantageously applied to the wire when it is initially inserted into engagement with the hinge plates, i. e., at the time the abutments 31 and 32 are formed. With such a spiral tension impressed upon the connector element, the door 25 has a normal tendency to swing into the closed position of Figure 3; and a movement of the door into the position of Figure 4 takes place against the action of the spiral tension. The same is true with respect to Figure 6.

This ability of the present hinge to fulfill a function heretofore accomplished only by the use of extraneous springs or the like indicates its applicability to cases, such as swinging doors or the like, where a normal position of hinged structural elements is desired.

In Figures 7 and 8, I have shown the manner in which the impression of a spiral tension on the element may be effected in an adjustable manner, even after the hinge is in use, thereby permitting the spiral tension to be varied to suit particular requirements. In this figure I have shown two hinge plates 36 and 37 held in pivotable relation by the spiral connector element 38, interlaced with perforations 39 and 40. At the ends of the element, adjustable abutments 41 and 42 are provided. For illustrative purposes, I have shown the spiral ends 43 and 44 with threads thereon, and the abutments 41 and 42 may be correspondingly threaded internally so as to engage over these ends. By tightening up upon the abutment 41, its inner surface will bear with variable stress against the face of the plate 36; and the same is true with respect to the abutment 42. In this way a variable spiral tension may be impressed upon the spiral element 38. It will be observed that the ends 43 and 44 are shown as straight, whereby a properly pitched screw thread may be applied thereto and binding will be obviated.

Obviously, an adjustable abutment need not necessarily be provided at each end of the spiral. One end may, for example, have a fixed abutment such as that shown at 31 and 32 in Figure 1, while the opposite abutment is of the adjustable character. Similarly, the adjustable abutment need not necessarily be of the threaded variety illustrated in Figures 7 and 8, but may, for example, consist of an abutment which is in some other manner shiftable along the end or any other part of the spiral. Nor need the abutments or their equivalents be formed necessarily at the end portions of the spiral connector.

One of the advantages of the present invention lies in the fact that the hinge may be so constructed that the connector may be removed at will by merely unlacing it. For example, in Figure 9, I have shown two hinge plates 64 and 65 provided with the perforations 66 and 67, and adapted to be interengaged by a spiral element 68 whose end 69 is in alignment with the spiral axis. A knob 70 may be formed on this end, so that by twirling the knob the free end of the spiral may be caused to pass successively through the alternate perforations of the plates and thereby thread the element 68 into proper interlaced engagement. A removal of the spiral element may then be accomplished by simply unlacing the spiral from the plates.

If desired, a removable abutment may be provided for engagement with the free end 71 of the spiral so as to prevent unlacing of the spiral under normal conditions. Such an abutment may, for example, take the form of the abutment 41 in Figure 7, or it may be of any other suitable type.

In Figure 10 I have shown a construction in which one end of the spiral is held in substantially fixed relation to the hinge plates, while resilient tension may be applied from its other end. In this figure the hinge plates are indicated at 81, 82, and the spiral connector at 83, the latter being shown as in threaded relation with perforations 84 and 85 of the respective hinge plates. The lower end of the spiral connector 83 is shown as held in place by a loop or abutment 86 formed at the end thereof, while at its upper end it is shown as provided with a loop 87, whereby it may be twisted so as to put it under resilient tension or to vary such tension. After such adjustment of the tension, the spiral connector may be retained in its tensioned position by applying a clamp member 88 or its equivalent to an end coil thereof, the said member serving to provide an abutment preventing unwinding of the spiral.

In Figures 11, 12 and 13 I have shown modified constructions in which, regardless of the features of the spiral connector element, the hinge plates are somewhat differently formed.

In Figure 11, the hinge plates 45 and 46 have the cut-out portions 47 at their opposite ends, the interlacing between the spiral 48 and the perforations 49 and 50 being restricted to the area between these cut-outs. This construction is sometimes desirable for the sake of keeping the end edges 51 and 52 of the hinge plates unencumbered by the ends of the spiral connector.

In Figure 12 the hinge plates 53 and 54 are provided with intermediate recesses or cut-out portions 55 and two spiral elements 57 and 58 are shown in engagement with the perforations of the abutting edge portions of the hinge plates. It will be observed that these spiral elements are shown as of opposite pitch, so that there is no relative up or down movement of the hinge plates, since this tendency in one spiral is counteracted by that in the other. The spiral elements 57 and 58 are shown as held in place by loops or abutments formed on the ends thereof.

The construction of Figure 13 resembles that of Figure 12 in all respects save that the spiral connectors thereof are arranged to have their tension adjusted. The hinge plates 53 and 54 are identical in shape with those of Figure 12, being also provided with intermediate recesses 55. The spiral elements 561, 562 are also oppositely pitched and have one end thereof held in place by a loop or abutment, but their inner ends extend into the recessed portions 55, where they are shown as meeting and extending in the same direction, so that a sleeve member 563 may be slipped thereover and clamped in place thereon. This sleeve member is of such extent that it will engage the edges of the hinge plates in the recessed portions thereof in abutting relation. From this description it will be clear that if the spirals are twisted after removing member 563, the tension imparted thereto will be retained after the application of member 563 which prevents untwisting.

In Figure 14 I have shown a connecting element 59 in interlaced engagement with hinge plates 60 and 61. The element 59, instead of being of spiral conformation, has its successive loops arranged in coaxial alignment. These portions are designated by the reference numeral 62. The advantage of this construction lies in the fact that there is no endwise relative movement of one hinge plate with respect to the other when the hinge plates are pivoted.

In Figure 15, I have shown the connector element of Figure 14 in perspective and on an enlarged scale. This figure clearly shows how the successive loops 641 thereof are arranged in parallel planes transverse to the axis of the connector. This type of connector may be formed in the manner shown, from a single length of wire or the like, the portions 63 of the wire being bent into alignment. These portions 63 may thereupon be welded together, if desired, or they may be left disconnected. If preferred, a series of circular rings or loops may be arranged, as in Figure 13, and connected by a single bar or rod of wire soldered or welded thereto at spaced points. The effect is the same in either case, and the connector is a unitary device comprising a series of loops arranged in axial alignment and in substantially parallel planes, each loop being interlaced with one perforation of one hinge plate and an adjacent perforation of the other hinge plate. Where the connector is formed of a single length of wire, as in Figure 15, it is interlaced with the hinge plates by a spiral movement, as hereinbefore described. Where it is formed of separate loops, each loop necessarily must have an opening therein to permit it to be threaded into engagement with the hinge plates.

In Figure 16 I have shown another modified construction in section. The hinge plates numbered 91 and 92 are shown as each comprising two angularly related portions so that their cross-section is V-shaped. One of these portions is connected to one of a pair of members 97 and 98 to be pivotally united, such as a door or jamb, so that the other angularly related portion projects outwardly therefrom, as clearly shown in the figure. This outwardly projecting portion is shown as provided with perforations through which the connecting element, such as a spiral element 94, is threaded. A subsidiary feature is constituted by a pair of plates 95 and 96 which are shown as attached to the respective members 97 and 98, so as to hide the spiral element 94 from view on one side thereof, when the members 97 and 98 are in alignment.

In Figure 17 I have shown a spiral element 101 threaded directly through a pair of members 102 and 103 that it is desired to unite pivotally. These members, which may be a door and a jamb, are therefore directly united by the spiral element and without the use of hinge plates associated with said members, the perforations 104 and 105 being provided directly in the said elements for that purpose. In order to keep the spiral 101 of the smallest possible diameter and yet permit relative swinging of the members 102 and 103 through an arc of 360° the perforations 104 and 105 are shown as having their end portions countersunk as shown at 106 and 107. When the element 103 is brought into its dotted line position, face to face with the element 102 it will be observed that the element 101 (also indicated in dotted lines) is in contact with the straight walls and with the countersunk portions of the perforations. If the countersunk portions are omitted the diameter of the spiral element 101 would have to be increased or the perforations would have to be made larger to permit this range of adjustment.

In Figure 18 the hinge plates 111 and 112 may be described as of substantially V conformation, and each plate has two rows of perforations 113 that are opposed to each other so that these perforations are arranged in pairs, and one of the coils of the spiral element 114 passes through each pair of these perforations. The free ends of the hinge plates are shown as arranged in parallelism so that they may be conveniently attached to the parallel faces of the constructional members 115 and 116. It will be obvious that the double support afforded in each hinge plate by the two rows of perforations greatly adds to the strength and resistance to wear of the hinge construction. By bending the hinge plates at a sharp angle at the apex of the V it is obvious that a great range of adjustment may be provided, as is indicated by the dotted line position of the element 116.

Referring next to Figures 19 and 20 it will be observed that I disclose therein a double door construction. The numerals 120 and 121 indicate the two doors and the numeral 122 indicates a central post about which they are designed to pivot, this post being anchored at one end thereof to the ceiling 123 and at the other end thereof to the floor 124. The spiral element 125 is shown as loosely surrounding the post 122 and as having its ends anchored thereto. A pair of auxiliary spiral elements 126 and 127 are shown as interthreaded with the central spiral element 125 and as interlaced with a pair of hinge plates 128 and 129 (the former being carried by door 120 and the latter by door 121) by passing them through perforations 130 and 131 arranged along one of the edges of said respective hinge plates 128 and 129. While the spirals are shown as fastened in place non-adjustably, it will be understood that adjustability may be provided therefor in any of the ways described or in other ways.

In Figure 21 I have shown a construction resembling that of Figure 19 in some respects. However the central spiral binding element 125 is omitted. In place thereof two spirals 132 and 133 are shown as intertwined with each other and as passing around the central post 134, which, as in Figure 19, may be supported from the floor and the ceiling. The spirals 132 and 133 are interlaced with the perforations 135 and 136 of a pair of hinge plates 137 and 138, these being carried respectively by constructional members 139 and 140.

In Figures 22 and 23 is illustrated a further variant of the double door idea. In this case each door 141 and 142, as before, carries a hinge plate 143 and 144, and each hinge plate is with perforations 145 and 146. Instead of a post, however, the central supporting member is shown as in the form of a flat plate 147 provided on its edges with two rows of perforations 148 and 149. This plate is shown as fastened to the ceiling 152 and it will be understood that it may also be fastened to the floor. The perforations of the hinge plates 143 and 144 are so pitched as to register with the perforations on the edges of the member 147 so that the spiral elements 150 and 151 may be threaded through said perforations.

In Figures 24 and 25 I have shown another double door construction in which however only a single spiral element is used. As before, a pair of hinge plates 160 and 161 is shown as carried by the doors 162 and 163, respectively, and through the perforations 164 and 165 thereof is threaded said single spiral element 166 that surrounds the contral post 167 and is anchored thereto. The post 167 is shown as supported from the ceiling 168 and it is to be understood that its opposite end may be similarly anchored to the floor.

In Figure 26 I have shown a construction that resembles that of Figures 24 and 25 but instead of being restricted to a pair of pivotally united members I have shown, by way of illustration, four such members 170, 171, 172 and 173, supported from a spiral element 174 surrounding the central post 175. This construction is particularly adapted for supporting panels for display purposes and of course is not restricted to four pivotally supported elements, exactly as shown. Obviously such number may be increased or diminished.

It will be understood that the variations and modifications herein illustrated are interchangeable with one another, and that one feature, e. g., the tensioning feature, may be conjointly used with any other feature, e. g., the cut-outs illustrated in Figures 9–11, and in any of the constructions shown. Generally speaking, it will be understood that the invention is susceptible of wide variations and modifications, to suit differing requirements, and that the constructions herein illustrated and described are merely illustrative.

For these reasons, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is:

1. In a hinge, a plurality of rigid hinge plates with a series of spaced perforations arranged parallel and adjacent to each of the contiguous edges, a spiral element of resilient wire interlaced with said perforations to hold said plates in pivotably connected relation, and means for impressing a spiral tension upon said element, said means comprising an abutment at one end of said element and adapted to bear against one of said plates, and an abutment at the other end of said element and adapted to bear against the other plate.

2. In a hinge, a pair of hinge plates with a series of spaced perforations arranged parallel and adjacent to each of the contiguous edges, a spiral element of resilient wire interlaced with said perforations to hold said plates in pivotably connected relation, and adjustable means for impressing a variable spiral tension upon said element, said means comprising an abutment at one end of said element adapted to bear against one of said plates, a second abutment at the other end of said element and adapted to bear against the other plate, at least one of said abutments being displaceable along the spiral element a sufficient distance to impart a tension to said element.

3. In a hinge, a plurality of rigid hinge plates, each having a row of spaced perforations adjacent one edge thereof, a spiral element of resilient wire interlaced under tension with said perforations to hold said plates in pivotally connected relation, and means to hold said spiral element under tension whereby said hinge plates will tend to assume a normally predetermined angular position when released.

4. In a hinge, a plurality of rigid hinge plates each having a row of spaced perforations adpacent one edge thereof, a spiral element of resilient wire interlaced under tension with said perforations to hold said plates in pivotally connected relation, and means to hold said spiral element under tension whereby said hinge plates will tend to asume a normally predetermined angular position when released, said plates having cut-out regions along their said edges having perforations adjacent thereto, and said spiral element being under tension but free of interlaced engagement with said plates in said cut-out regions.

5. In a hinge, a plurality of rigid hinge plates each having a row of spaced perforations adjacent one edge thereof, a spiral element of resilient wire interlaced under tension with said perforations to hold said plates in pivotally connected relation, and means to hold said spiral element under tension whereby said hinge plates will tend to assume a normally predetermined angular position when released, said plates having cut out regions at an intermediate portion of their opposed edges, said cut out regions being of sufficient width to accommodate the spiral element, and said spiral element being under tension but free of interlaced engagement with said plates in said cut out regions.

6. A hinge comprising a pair of rigid hinge plates each provided with perforations along one edge thereof, said perforations of the respective plates being adapted to register when said plates are superposed, a spiral element threaded through said perforations of both plates so as to hingedly unite them, and said element having its ends protruding beyond the hinge plates, said protruding ends being threaded, and complementary threaded means in threaded engagement with said ends, and having abutments thereon adapted to contact said hinge plates when adjusted in relation to said element so as to impart a spiral tension to said element and said threaded protruding ends being straight whereby a wide range of adjustment of said abutments may be effected without binding.

7. A hinge for doors or the like comprising a plurality of hinged plates of rigid material and means for associating the two plates in pivotal relation for movement between two limiting angular positions, said means comprising at least one row of spaced perforations in the respective plates and a spiral element of resilient wire interlaced with said perforations to hold said plates in pivotally connected relation, means carried by said spiral elements for impressing a spiral tension to cause a relative movement between the plates to a normal position at one of said limiting angular positions.

WALTER GRUMBACHER.